July 6, 1965 E. M. SMITH 3,193,244
PLUG VALVE WITH IMPROVED EXPANDABLE PLUG
Filed Nov. 23, 1960 2 Sheets-Sheet 1
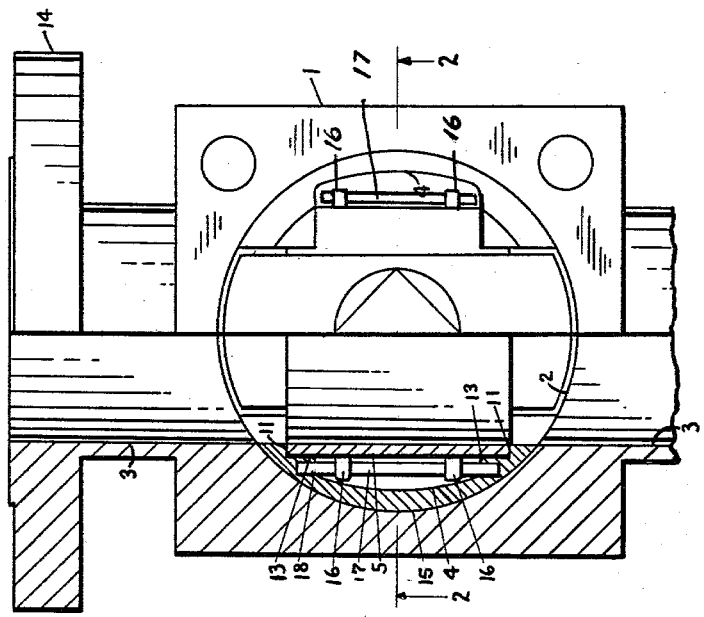
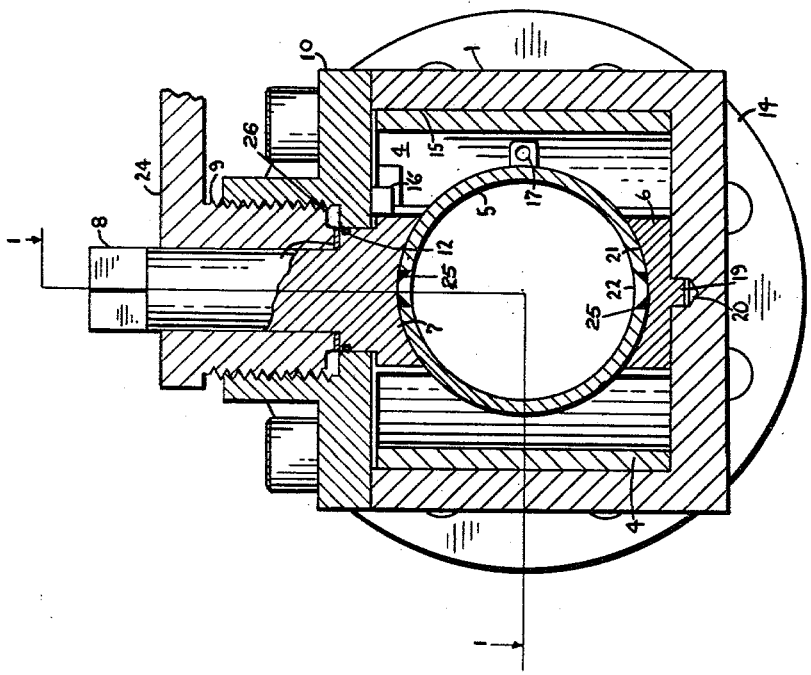
INVENTOR.
EDWARD M. SMITH
BY
Charles L. Lovercheck
ATTORNEY July 6, 1965 E. M. SMITH 3,193,244
PLUG VALVE WITH IMPROVED EXPANDABLE PLUG
Filed Nov. 23, 1960 2 Sheets-Sheet 2

INVENTOR.
EDWARD M. SMITH
BY
Charles L. Lovercheck
attorney

United States Patent Office 3,193,244
Patented July 6, 1965

3,193,244
PLUG VALVE WITH IMPROVED
EXPANDABLE PLUG
Edward M. Smith, Lexington, Ohio, assignor to Trymac
Corporation, Erie, Pa., a corporation of Pennsylvania
Filed Nov. 23, 1960, Ser. No. 71,262
3 Claims. (Cl. 251—161)

This invention relates to valves and, more particularly, to the type of valve known as a plug valve.

Plug valves which have been made according to previous designs have generally relied upon the close fit between the plug and the bore in the valve in order to prevent leakage. The frictional force exerted by the valve which had to be overcome to rotate the plug was directly related to the tightness of fit of the plug in the valve and, therefore, if a valve had a tight fit, it was usually hard to rotate the plug.

In other cases, the space between the plug and body was filled with heavy lubricant to reduce friction and improve sealing. The lubricant is subject to washing away, will not stand high temperatures, and contaminates fluid.

In the present invention a plug valve is provided wherein the plug is, in effect, expandable and clearance between the plug and the bore is increased before the plug is rotated. Since there is little or no rubbing between the valve body and the plug, no lubricant is needed.

Accordingly, it is an object of the present invention to overcome the above and other defects in previous plug valves and, more particularly, it is an object to provide a plug valve which is simple in construction, economical to manufacture, and simple and efficient to use.

Another object of the invention is to provide an improved plug valve.

Still another object of the invention is to provide a plug valve having an expanding plug which eliminates the need for a lubricant and which rotates easily.

Yet another object of the invention is to provide a plug member which may be distorted in cross sectional dimension such that the section between the center and point of pressure during elastic distortion retains its outer surface in the shape of a cylinder.

A further object of this invention is to provide a valve which has a plug which is so designed that it bends equally at the ends and in the center or as required to seat tightly against the body.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a top cross sectional view taken on line 1—1 of FIG. 2 of a valve according to the invention with the bonnet removed;

FIG. 2 is a cross sectional view taken on line 2—2 of FIG. 1;

Figure 3:
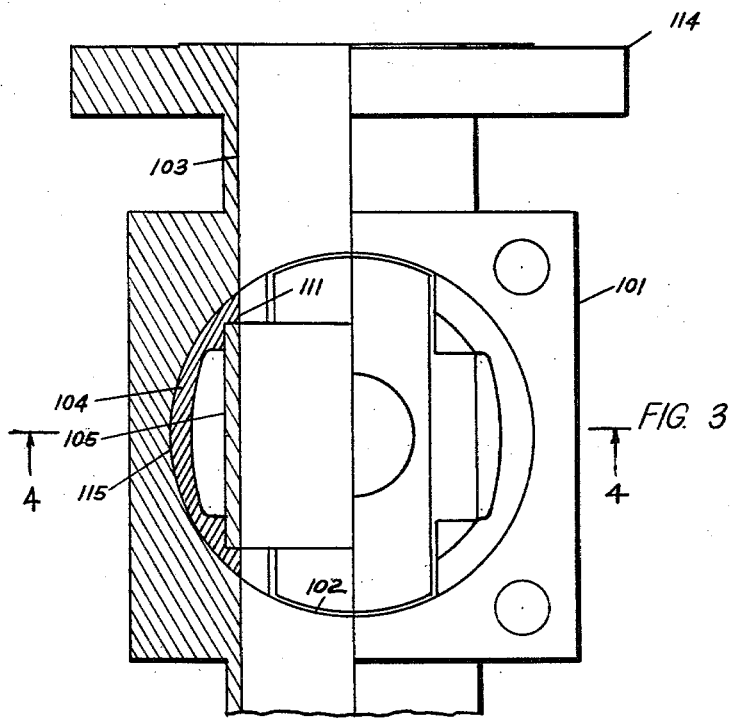
FIG. 3 is a view similar to FIG. 1 of another embodiment of the invention taken on line 3—3 of FIG. 4.

Now with more particular reference to the drawings, a valve is shown having a body 1. The body 1 has a longitudinally extending cylindrical bore 3 which forms a flow passage through the valve with inlet and outlet openings at each end thereof. The valve may have flanges 14, one of which is shown integrally attached thereto at each end for connecting the valve in a fluid line.

The valve body 1 also has a transverse bore 15 which defines a seating surface for seating shoes 4. The shoes 4 are in the form of segments of a cylinder and they are disposed in a bore 15. The shoes 4 are held in place by a cylinder 5. The cylinder 5 has its longitudinal axis disposed perpendicular to the axis of the cylinder defining the shoes 4. Recesses are formed in the shoes 4 which define shoulders 11. The opposite sides of the cylinder 5 fit into the recesses in the shoes 4 and rest against the shoulders 11. Ears 16 are integrally attached to the cylinder 5 and these ears are bored to receive pins 17. The pins 17 extend through these bores and into bores 18 in the seating shoes 4. The ears 16 cause the cylinder 5 to pull the shoes 4 away from the walls of the bore 15 when the pressure exerted by a bearing shoe 7 is released.

A lower bearing plate 6 has a pilot pin 19 integrally attached thereto which is received in a blind hole 20 in the body 1. An upper surface 21 of the bearing plate 6 is concave and it receives the lower surface of the cylinder 5. The upper bearing shoe 7 is integrally attached to a stem 8 and rotates therewith. The lower end surface of the bearing shoe 7 is also concave and it receives the upper surface of the cylinder 5. Holes 22 are bored in the upper and lower surfaces of the cylinder through which welding material 25 is placed. The welding material fixes the cylinder to the bearing members 6 and 7.

A bonnet 10 has a threaded counterbore which terminates in the bore which receives the upper stepped portion of the stem 8. A groove 12 is cut in the stepped portion of the stem 8 and it receives an O-shaped packing washer 26 to form a seal between the stem and the bonnet 10.

The stem 8 is centrally located within a jack nut 9 and the jack nut 9 threadably engages the threaded bore in the bonnet 10. The jack nut 9 has a handle 24 which may be used to rotate the jack nut and thus force the stem downward and distort the cylinder 5 so that its lateral dimension increases and thus forces the shoes 4 into sealing engagement with the inside walls of the bore 15.

A stop pin 16' attached to the bearing shoe 7 moves in a recess in the shoe 4 and is provided to limit the travel of the operating stem 8 to ninety degrees.

To operate the valve, the stem 8 is rotated which in turn rotates the bearing shoe 7, the cylinder 5 which may be considered to be a ring, the lower bearing plate 6, and the shoes 4. Since the cylinder 5 engages the two cylindrical shoes 4 at the recessed shoulders 11, it causes the segments to turn with the cylinder 5. When the seating shoes 4 are located over the bores 3 when the jack nut 9 is turned down against the shoulder 11, the shoulder will force the shoe 7 down to distort the cylinder 5, thus increasing its lateral dimension. The pressure from the shoe 7 forces the cylinder 5 to assume an elliptical shape which in turn transmits pressure against the shoes 4 at bearing surfaces 13. This pressure forces the shoes 4 outwardly against the inner surface of a cylindrical bore 2, thus sealing the bores 3 against the passage of fluid.

The shoes 4 have an external radii slightly smaller than the radius of the bore 15 to insure a complete sealing of the bores 3. This causes the shoes 4 to contact the bore first at the center of the shoes 4. Continued application of pressure at the bearing surfaces 13 will therefore cause the shoes 4 to deflect to conform with the surface of the bore 2, thus completely sealing the flow passage through the bore 3. It will be noted that the section of the shoes 4 between the bearing surfaces 13 has been relieved to permit the shoe to assume the shape of the bore 2 with a minimum amount of stress within the shoe and with a minimum amount of pressure at the bearing surfaces 13.

Figure 4:
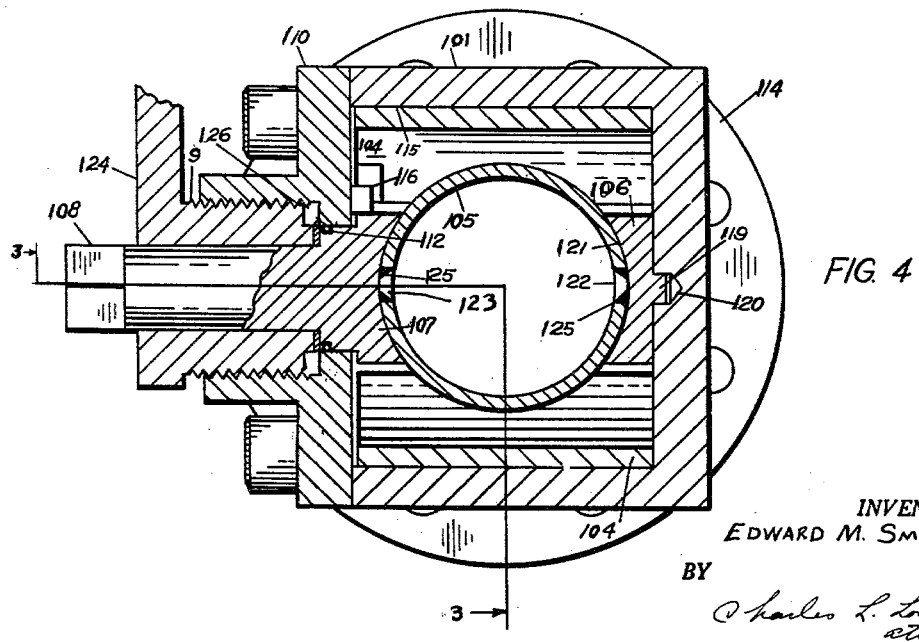
FIG. 4 is a cross sectional view taken on line 4—4 of FIG. 3.

In the embodiment of the invention shown in FIGS. 3 and 4, a valve is shown having a body 101 with a cylindrical bore 103. The cylindrical bore 103 forms a flow passage through the valve with openings at each end thereof. The valve may have flanges 114, one of which is shown integrally attached thereto for connecting the valve in a fluid line.

The valve body 101 has a transverse bore 115 which defines a seating surfaces for shoes 104. The shoes 104 are in the form of cylindrical segments and they are disposed in the bore 115. The seating shoes 104 are held in place by a cylinder 105. The cylinder 105 has its longitudinal axis disposed perpendicular to the axis of the cylinder defining the shoes 104 and recesses defining shoulders 111 are formed in the shoes 104. The opposite sides of the cylinder 105 fit into the recesses in the shoes 104.

In this embodiment of the invention, there are no parts corresponding to the ears 16, pins 17, and bores 18 shown in FIGS. 1 and 2. Therefore, the shoes 104 float when the pressure is released by the stem on the cylinder 105 and while this makes a more economical and simpler valve structure, it does not have the advantage of providing a positive force on the shoes to pull them away from the inside of the bore when the stem is released.

Lower bearing shoe 106 has a pilot pin 119 thereon which is received in a blind hole 120 in the body 101. The upper surface of the bearing shoe 106 is concave at 121 and it receives the lower surface of the cylinder 105. An upper bearing shoe 107 is integrally attached to a stem 108 and rotates therewith. The lower end of the bearing shoe 107 is also concave to receive the upper surface of the cylinder 105. Holes 122 and 123 are bored in the upper and lower edges of the cylinder through which welding material 125 is disposed which welds the cylinder to the bearing shoes.

A bonnet 110 has a threaded counterbore which terminates in the bore which receives the upper stepped portion of the stem 108. A groove 112 is cut in the stepped portion of the stem 108 and it receives an O-shaped packing washer 126 to form a seal.

The stem 108 is centrally located within a packing nut 109 and the packing nut 109 threadably engages a threaded bore in the bonnet. The packing nut 109 has a handle 124 which may be rotated to force the stem downward and distort the cylinder 105 by distorting it to decrease its lateral dimension and increase its longitudinal dimension to force the shoes into sealing engagement with the walls of the bore 115.

A stop pin 116 is attached to the shoe 107 to limit the travel of the stem 108 to ninety degrees.

To operate the valve, the stem 108 is rotated which in turn rotates the upper bearing shoe 107, the cylinder 105, the lower bearing shoe 106, and the shoes 104. The cylinder 105 engages the two cylindrical shoes 104 at the recessed shoulders 111, causing the shoes 104 to turn with the cylinder 105. When the shoes 104 are located over the bores 103, the nut 109 is turned down against the shoulder 111 which in turn forces the shoe 107 against the side of the cylinder 105. The pressure from the shoe 107 forces the cylinder 105 to assume an elliptical shape which in turn transmits pressure against the shoes 104 at bearing surfaces 113. This pressure forces the shoes 104 outwardly against the inner surface of a cylindrical bore 102, thus sealing the bores 103 against the passage of fluid.

To insure a complete sealing of the bores 103, the shoes 104 have an external radii slightly smaller than the radius of the bore 115, thus causing the shoes 104 to contact the bore first at the center of the shoes 104. Continued application of pressure at the bearing surfaces 113 cause the shoes 104 to be deformed to comply with the surface of the bore 102, thus completely sealing the flow passage through the bore 103.

It will be noted that the section of the shoes 104 between the bearing surfaces 113 is relieved to permit the shoe 104 to assume the shape of the bore 102 with a minimum amount of stress within the shoe and with a minimum amount of pressure at the bearing surfaces 113.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A plug valve comprising a body with a flow passage therethrough, a lateral bore in said body, two spaced cylindrical segments, one disposed over each said flow passage and in said lateral bore, said cylindrical segments being of slightly smaller radii than the radius of said lateral bore, a cylinder disposed between said cylindrical segments with its axis perpendicular to the axes of said cylindrical segments, means on said cylindrical segments on opposite sides thereof engaging diametrically opposite portions of said cylinder, and means to compress said cylinder laterally between said cylindrical segments whereby said cylindrical segments are urged outwardly into engagement with the outer walls of said lateral bore, means to rotate said cylinder to bring the inside thereof into alignment with said flow passages, said rotating means comprising a pressure shoe attached to each side of said cylinder, a packing nut threadably engaging said body and engaging one said pressure shoe, and a stem for rotating said cylinder attached to one said pressure shoe and extending through said packing nut.

2. The valve recited in claim 1 wherein said means on said cylindrical segments comprises spaced ears attached to said cylinder at each side thereof, and a pin extends through bores in said ears and in bores in said cylindrical segments whereby said segments are held to said cylinder.

3. A valve comprising a body with a flow passage therethrough, a lateral bore in said body intercepting said flow passage, spaced cylindrical segments in said lateral bore, a cylinder having its axis disposed perpendicular to the axes of said cylindrical segments, a pressure shoe welded to each diametrically opposite side of said cylinder and conforming generally to the outer surface thereof, a pilot pin on one said pressure shoe, said pilot pin being rotatably supported in a bore in the bottom of said body in said lateral bore, said lateral bore being open at one end and closed at the other end, a bonnet closing said open end, said bonnet having a bore and a counterbore therein, a stem, said stem having a stepped portion defining a shoulder engaging the underside of said bonnet, a peripheral groove in said stepped portion, an O-shaped sealing washer in said groove, said counterbore in said bonnet being threaded, a packing nut threadably engaging said threaded counterbore, and a bore in said packing nut receiving said stem, the lower side of said packing nut engaging said shoulder on said stem whereby said packing nut can be tightened to force said pressure shoes in a direction toward each other distorting said cylinder and forcing said cylindrical segments laterally whereby said cylindrical segments can be forced outwardly into sealing engagement with said flow passage, said cylindrical segments being of slightly lesser radii than the radius of said lateral bore and said cylinder engaging the opposite edges of said segments whereby said segments are distorted by said cylinder into sealing engagement with the walls of said valve.

References Cited by the Examiner

UNITED STATES PATENTS

| | | | |
|---|---|---|---|
| 681,987 | 9/01 | Schumann | 251—187 |
| 2,072,965 | 3/37 | Robinson | 251—188 |
| 2,372,869 | 4/45 | Wheatley | 251—188 |
| 2,501,635 | 3/50 | Schmidt | 251—163 |
| 2,564,147 | 8/51 | Bowling | 251—162 |
| 2,836,388 | 5/58 | Rakus | 251—182 |

FOREIGN PATENTS 2,769   2/84   Great Britain.

ISADOR WEIL, *Primary Examiner.*